(12) United States Patent
Carter et al.

(10) Patent No.: US 8,365,381 B2
(45) Date of Patent: Feb. 5, 2013

(54) VEHICLE CLOSURE MEMBER MOUNTING

(75) Inventors: Thomas J. Carter, Shelby Township, Macomb County, MI (US); Timothy J. Marx, Macomb, MI (US); Thomas W. French, Imlay City, MI (US)

(73) Assignee: Utica Enterprises, Inc., Shelby Township, Macomb County, MI (US)

(*) Notice: Subject to any disclaimer, the term of this patent is extended or adjusted under 35 U.S.C. 154(b) by 0 days.

(21) Appl. No.: 13/185,611

(22) Filed: Jul. 19, 2011

(65) Prior Publication Data

US 2012/0017413 A1 Jan. 26, 2012

Related U.S. Application Data

(60) Provisional application No. 61/400,207, filed on Jul. 22, 2010.

(51) Int. Cl.
*B23Q 17/00* (2006.01)
*B23P 21/00* (2006.01)
(52) U.S. Cl. .................. 29/407.1; 29/712
(58) Field of Classification Search .............. 29/428, 29/407.1, 407.04, 407.05, 407.09, 407.01, 29/700, 707, 709, 712, 714, 721, 283, 281.6, 29/434
See application file for complete search history.

(56) References Cited

U.S. PATENT DOCUMENTS

| 4,765,025 | A | 8/1988 | Salazar |
| 6,691,392 | B2 * | 2/2004 | Savoy et al. ............... 29/407.09 |
| 6,711,800 | B2 * | 3/2004 | Savoy .............................. 29/434 |
| 7,089,626 | B2 | 8/2006 | Alexander |
| 7,143,494 | B2 | 12/2006 | Savoy |
| 2008/0303307 | A1 | 12/2008 | Savoy |

OTHER PUBLICATIONS

Notification of Transmittal of the International Search Report and the Written Opinion of the International Searching Authority dated Dec. 19, 2011, Application No. PCT/US 11/44417, Applicant Utica Enterprises, Inc.

* cited by examiner

*Primary Examiner* — John C Hong
(74) *Attorney, Agent, or Firm* — Brooks Kushman P.C.

(57) ABSTRACT

A system and method for mounting a vehicle closure member (62) on a vehicle body (40) utilizes vision sensing of a master gauge location (42) of the vehicle body, of coordination formations (48) on the vehicle body, and of opening extremities of a closure member opening of the vehicle body, and the sensing is used by a controller (34) to provide mounting of a hinge at a proper location.

11 Claims, 4 Drawing Sheets

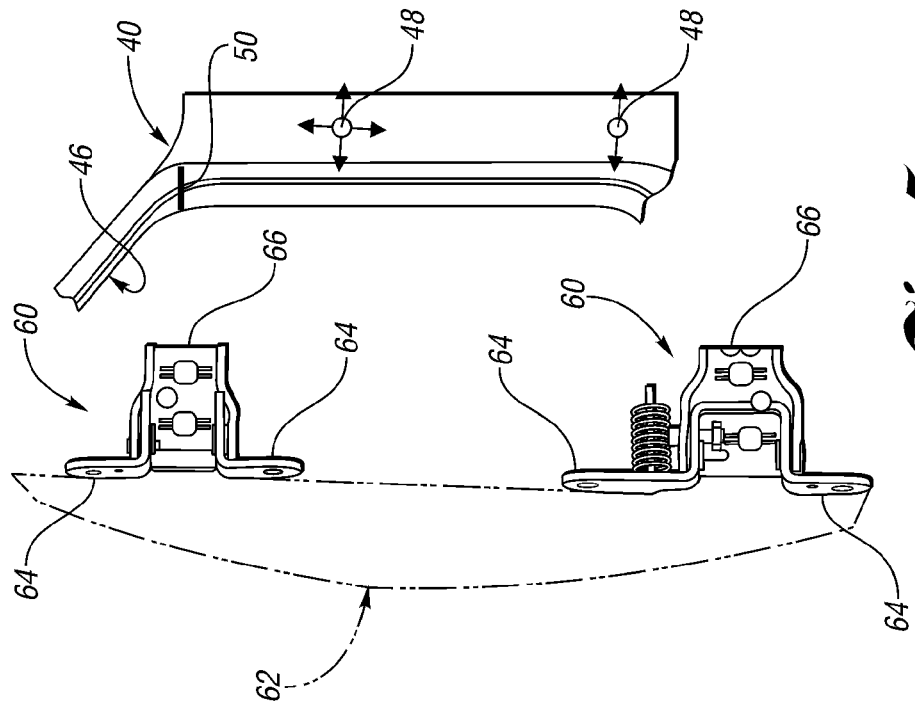
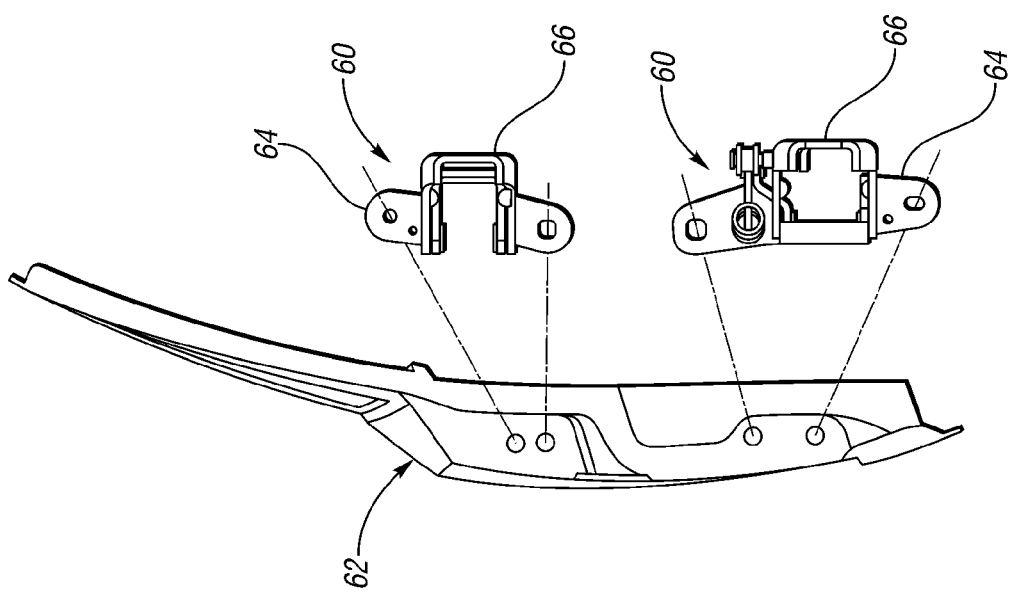

VEHICLE CLOSURE MEMBER MOUNTING

CROSS-REFERENCE TO RELATED APPLICATIONS

This application claims the benefit of U.S. provisional Application No. 61/400,207 filed Jul. 22, 2010, the disclosure of which is incorporated in its entirety by reference herein.

TECHNICAL FIELD

This invention relates to a system and method for mounting vehicle closure members such as doors, deck lids, hoods, lift gates and drop gates, etc. on a vehicle body with proper positioning with respect to an associated vehicle body opening.

BACKGROUND

Vehicle closure members such as doors have been mounted in different ways such as disclosed by United States published patent application 2008/0303307 published on Dec. 11, 2008.

SUMMARY

An object of the invention is to provide an improved system for mounting a vehicle closure member on a vehicle body.

In carrying out the above object, a system for mounting a vehicle closure member on a vehicle in accordance with the invention includes a vision station for sensing the location of a vehicle body within the vision station and for sensing the position of a coordination formation of the vehicle body and the positions of spaced opening extremity locations of a closure member opening of the vehicle body. A hinge station of the system receives the closure member as well as forming a coordination formation on a vehicle body hinge plate of the hinge at a location controlled by the sensing performed at the vision station. The vehicle body and the closure member with the hinge mounted thereon are moved to a closure member mounting station of the system at which the coordination formation of the vehicle body hinge plate is positioned with respect to the coordination formation of the vehicle body to provide positioning of the closure member with respect to the vehicle body opening for mounting of the closure member hinge plate on the vehicle body.

The system as disclosed mounts a vehicle door on a vehicle body using the vision station, the hinge station and mounting station, and, more specifically, includes both front and rear hinge stations and front and rear door mounting stations for mounting front and rear doors.

Another object of the invention is to provide an improved method for mounting a vehicle closure member on a vehicle body.

In carrying out the immediately preceding object, the method for mounting a vehicle closure member on a vehicle body senses the location of a vehicle body within a vision station and senses the position of a coordination formation of the vehicle body and the positions of spaced opening extremity locations of a closure member opening of the vehicle body. A closure member and a hinge are transferred to a hinge station, a closure member hinge plate of the hinge is mounted on the closure member at the hinge station and a coordination formation is formed on a vehicle body hinge plate of the hinge at a location controlled by the sensing performed at the vision station. The closure member with the hinge mounted thereon is transferred to a closure member mounting station where the coordination formation of the vehicle body hinge plate is positioned with respect to the coordination formation of the vehicle body to provide positioning of the closure member with respect to the vehicle body opening as the vehicle body hinge plate is mounted on the vehicle body.

As disclosed, the sensing, the forming of the coordination formation, the mounting of the hinge on the closure member and the mounting of the hinge on the vehicle body is performed to mount a vehicle door with respect to a door opening of the vehicle body. Both a front door and a rear door are mounted with respect to front and rear door openings by the sensing, the forming of the coordination formation and the door mounting.

In one practice of the method, the closure member hinge plate is provide with a pair of oversized fastener openings between which the coordination formation thereof is provide and the vehicle body is provided with a pair of oversized openings aligned with the oversized openings of the vehicle body hinge plate, with the coordination formation of the vehicle body hinge plate and the coordination formation of the vehicle hinge plate positioned with respect to each other, and with threaded fasteners inserted through the oversized openings of the vehicle body hinge plate through the oversized openings in the vehicle body, and into threaded openings in a back plate on the vehicle body to provide the mounting.

In another practice of the method, a threaded fastener is inserted through aligned holes embodying the coordination formation of the vehicle body hinge plate and the coordination formation of the vehicle body with a snug fit that provides positioning, and by threading the threaded fastener onto a threaded nut to provide securement of the door mounting. In this practice of the method, another threaded fastener is inserted through aligned oversized holes in the vehicle body hinge plate and in the vehicle body spaced from the first mentioned threaded fastener, and a nut is threaded onto the second mentioned threaded fastener to further secure the door mounting.

BRIEF DESCRIPTION OF THE DRAWINGS

FIG. 4 is a view showing the door and hinges with the hinges at an enlarged scale for purposes of illustration.

FIG. 5 is a side elevational view that illustrates mounting of the hinges, with the door mounted thereon, on the vehicle body.

DETAILED DESCRIPTION

Figure 1:
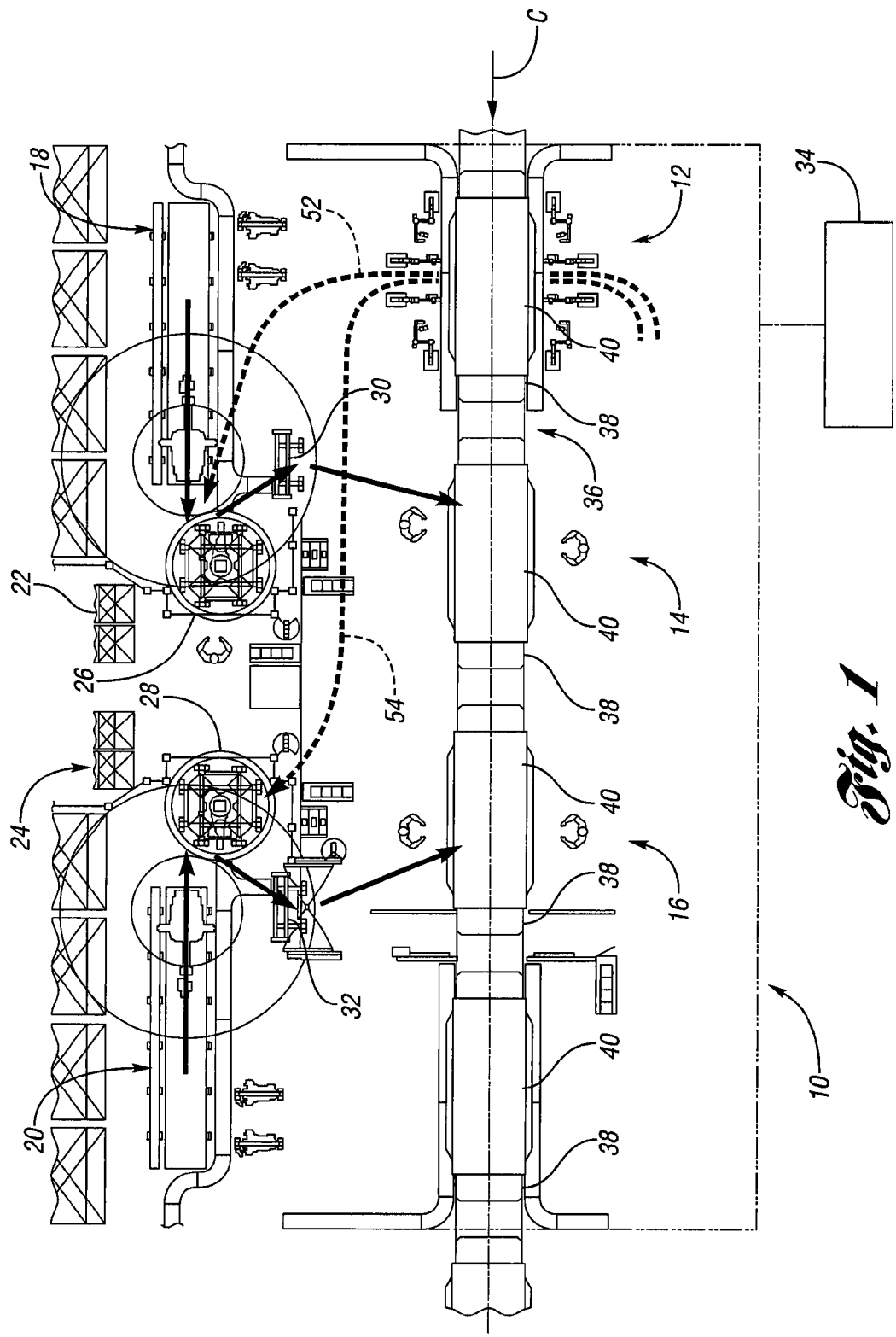
FIG. 1 is a top plan view of a system for mounting vehicle closure members on a vehicle body and has a vision station and, as illustrated, has front and rear door mounting stations for mounting on both the passenger and driver side of the vehicle body as it is conveyed from the right toward the left.

With reference to FIG. 1, a system 10 for mounting vehicle closure members is constructed in accordance with the present invention and performs the method thereof as is hereinafter more fully described. Both the system and method will be described in an integrated manner to facilitate an understanding of different aspects of the invention.

With continuing reference to FIG. 1, the system 10 includes a vision station 12, and for both the driver and passenger side of the vehicle body includes rear and front door mounting stations 14 and 16, rear and front door supply lines 18 and 20, rear and front hinge supplies 22 and 24, rear and front hinge stations for providing positioning locations on the hinges and mounting the hinges on the vehicle door, rear and front transfer fixtures 30 and 32 for respectively moving the rear and front doors with the hinges thereon to the rear and front door mounting stations 14 and 16 for mounting, and a controller 34 connected to all of the previously mentioned components of the system to coordinate their operation for the door mounting.

A conveyor collectively indicated by 36 includes pallets 38 for conveying vehicle bodies 40 through the system along the direction of conveyance illustrated by arrow C. This conveyance like the operation of the other components of the system is under the operation of the controller 34.

Figure 2:
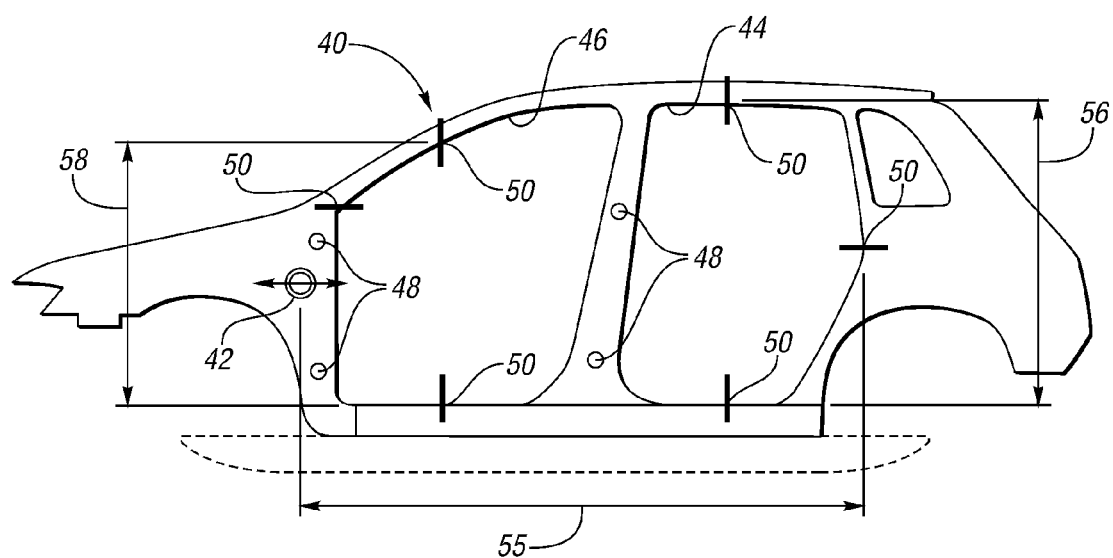
FIG. 2 is a side elevation of a vehicle body which has a master gauge target, coordination holes, and body opening targets that are utilized in connection with the door mounting to provide proper positioning.

As illustrated in FIG. 2, each vehicle body 40 has a master gauge location 42 that is sensed at the vision station 12 preferably by an electromagnetic wave sensor that is most preferably a laser sensor. Rear and front door openings 44 and 46 have coordination formations 48 that are sensed at the vision station 12 and respectively located at upper and lower positions on both the rear of the front quarter panel area and the generally vertical pillar between the door openings. Extremity locations 50 of the door openings are also sensed at the vision station and are sent as shown by arrows 52 and 54 in FIG. 1 to the rear and front hinge stations 26 and 28. This sensing also provides the longitudinal distance between the master gauge location 42 and the rear extremity 50 of the rear door opening 44 as shown by arrow 55 as well as the vertical distance between lower and upper extremity locations of the rear and front door openings 44 and 46 as shown by arrows 56 and 58, respectively.

Figure 3:
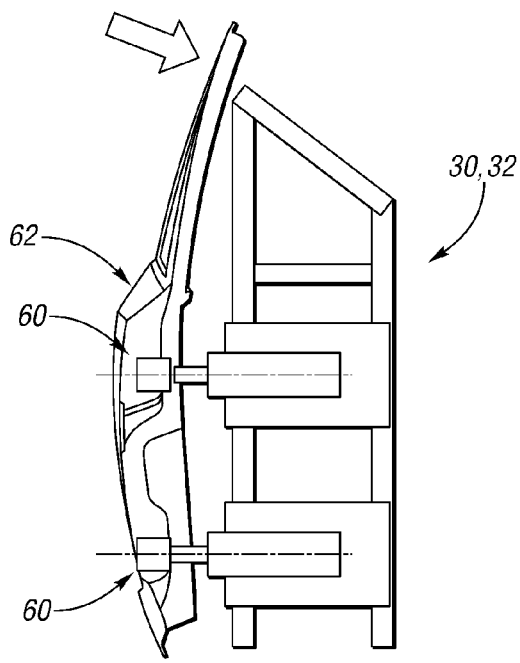
FIG. 3 is a view taken in a longitudinal direction with respect to the vehicle body and illustrates a fixture for mounting hinges on the vehicle door.

As shown in FIGS. 3-5, hinges 60 supplied to the rear and front hinge stations 26 and 28 shown in FIG. 1 are mounted at both upper and lower locations on an associated vehicle door 62 as shown in FIGS. 3 and 4 and are subsequently mounted on the vehicle body 40 as shown in FIG. 5. Each hinge 60 includes a closure member or door hinge plate 64 and a vehicle body hinge plate 66, with the hinge plates pivotally connected to each other by conventional hinge pins for movement about a pivotal axis about which the door is movable between closed and opened positions with respect to the associated door opening. At the associated hinge station 26 or 28 shown in FIG. 2, the hinges 60 are mounted on the door 62 by suitable unshown fasteners. As is hereinafter more fully described, the vehicle body hinge plate 66 is also provided with a coordination formation in preparation for the hinge and door mounting on the vehicle body. The fixture 30 or 32 shown in FIG. 3 moves the door 62 with the hinges 60 mounted thereon to the associated rear or front door mounting station 14 or 16 shown in FIG. 1 for positioning at the proper location for the mounting under the control of the data sensed at the vision station 12 and operation of the controller 34 using that data to properly position the door.

Figure 6:
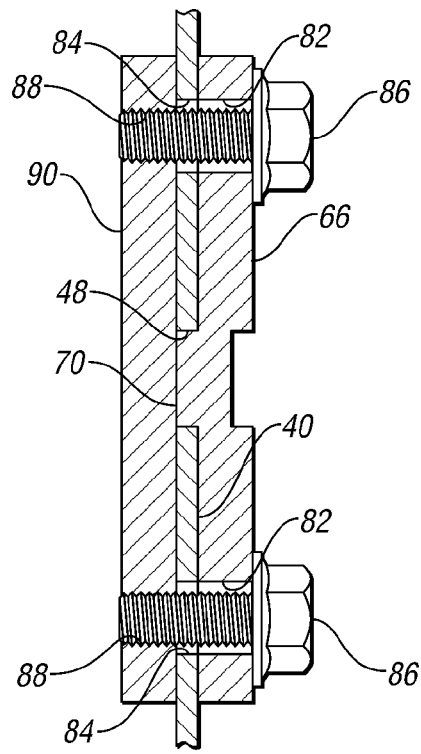
FIG. 6 is a sectional view that illustrates the manner in which the hinges are mounted on the vehicle body in one practice of the invention when there is no access to the unexposed backside of the vehicle body during the mounting.
Figure 8:
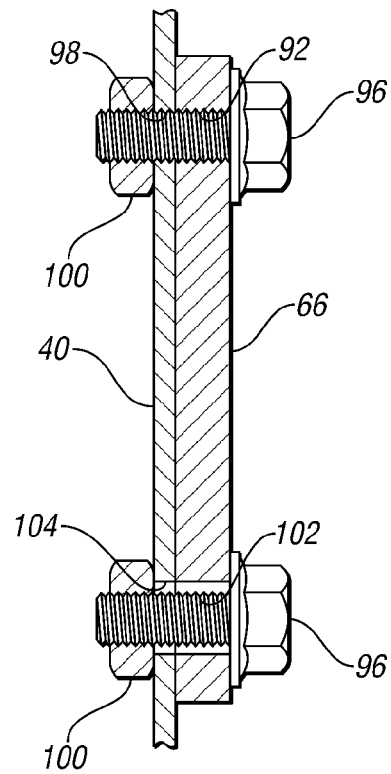
FIG. 8 is a sectional view that illustrates the manner in which the hinges are mounted on the vehicle body in another practice of the invention when there is access to the unobserved backside of the vehicle body during the mounting.
Figure 7:
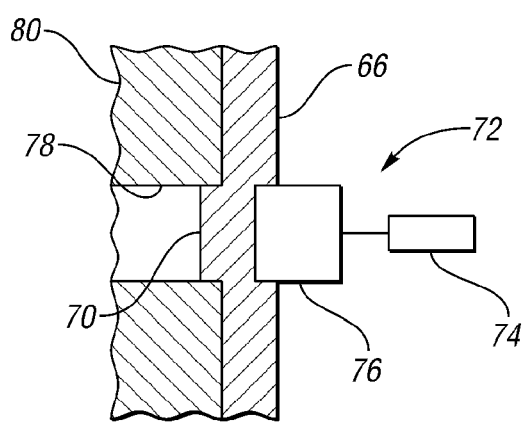
FIG. 7 is a sectional view that illustrates the manner in which the coordination formations is formed in the vehicle body hinge plate of the hinge in the FIG. 6 mode.
Figure 9:
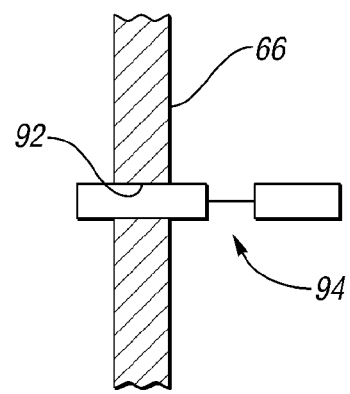
FIG. 9 is a sectional view that illustrates the manner in which the coordination formation is formed in the vehicle body hinge plate of the hinge in the FIG. 7 mode.

Two different embodiments of the door hinge mounting on the vehicle body 40 are respectively shown by FIGS. 6 and 7 and by FIGS. 8 and 9.

More specifically in FIGS. 6 and 7, the vehicle body hinge plate 66 has a location formation 70 that is provided as shown in FIG. 7 by a punch assembly 72 whose actuator 74 moves a punch 76 to partially punch through the vehicle body hinge plate 66 and provide the location formation 70 within an opening 78 of a mandrel 80. The location formation 70 of the vehicle body hinge plate 66 formed as shown in FIG. 7 upon the door assembly is received within the location formation 48 provided by the hole in the vehicle body to provide proper positioning of the hinge. Aligned oversized holes 82 and 84 in both the vehicle body hinge plate 66 and the vehicle body 40 receive associated threaded fasteners 86 that are threaded into associated threaded holes 88 of a backing plate 90 on the backside of the vehicle body 40. The oversized relationship of the holes 82 and 84 with respect to the threaded fasteners 86 allows appropriate positioning with the backing plate being suitably secured prior to the hinge mounting at a location which is not accessible at this state of the vehicle body manufacturing due to the construction of the vehicle body. Nevertheless, the location formations 48 and 70 insure that the hinge is properly positioned for mounting of the door on the vehicle body.

In the embodiment of FIGS. 8 and 9, the vehicle body hinge plate 66 is provided with a location formation 92 by either a punch or drill assembly schematically illustrated at 94. A headed threaded fastener 96 extends through the location formation 92 provided by the hole 62 and an aligned hole 98 in the vehicle body 40 for threading to a nut 100 on the backside of the vehicle body 40. Both the hole of the location formation 92 and the hole 98 are snug with respect to the threaded shank of the fastener 96 so as to provide proper positioning. Another threaded fastener 96 of this embodiment extends through aligned oversized holes 102 and 104 in the door hinge plate 60 and in the vehicle body 40 through an associated threaded nut 100 with the oversized construction permitting required movement for the proper positioning of the door hinge with respect to the vehicle body.

The sensing of the vehicle body position by the master gauge location 42 and the sensing of the coordination formations 48 as well as sensing of the door opening extremities 50 provides signals that can be processed by the controller 34 in mounting the door. This mounting provides uniformity in the spacing of each door with respect to the vehicle body door openings as well as between the rear extremity of the front door and the front extremity of the rear door.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for mounting vehicle closure members on a vehicle body comprising:
   a vision station for sensing the location of a vehicle body within the vision station and for sensing the position of a coordination formation of the vehicle body and the positions of spaced opening extremity locations of a closure member opening of the vehicle body;

a hinge station that receives the closure member and a hinge and mounts a closure member hinge plate of the hinge on the closure member and also forms a coordination formation on a vehicle body hinge plate of the hinge at a location controlled by the sensing performed at the vision station; and a closure member mounting station to which the vehicle body and the closure member with the hinge mounted thereon are moved and at which the coordination formation of the vehicle body hinge plate is positioned with respect to the coordination formation of the vehicle body to provide positioning of the closure member with respect to the vehicle body opening for mounting of the closure member hinge plate on the vehicle body.

2. A system for mounting a vehicle closure member on a vehicle body as in claim 1 wherein the vision station, the hinge station and mounting station provide mounting of a vehicle door on the vehicle body.

3. A system for mounting a vehicle closure member on a vehicle body as in claim 2 which includes both front and rear hinge stations and front and rear door mounting stations.

4. A method for mounting a vehicle closure member on a vehicle body, comprising:

sensing the location of a vehicle body within a vision station and sensing the position of a coordination formation of the vehicle body and the positions of spaced opening extremity locations of a closure member opening of the vehicle body;

transferring a closure member and a hinge to a hinge station, mounting a closure member hinge plate of the hinge on the closure member at the hinge station, and also forming a coordination formation on a vehicle body hinge plate of the hinge at a location controlled by the sensing performed at the vision station; and transferring the closure member with the hinge mounted thereon to a closure member mounting station and positioning the coordination formation of the vehicle body hinge plate with respect to the coordination formation of the vehicle body to provide positioning of the closure member with respect to the vehicle body opening and then mounting the vehicle body hinge plate on the vehicle body.

5. A method for mounting a vehicle closure member on a vehicle body as in claim 4 wherein the sensing, coordination formation and the mounting of the hinge on the closure member and the mounting of the hinge on the vehicle body is performed to mount a vehicle door with respect to a door opening of the vehicle body.

6. A method for mounting a vehicle closure member on a vehicle body as in claim 5 wherein the sensing, coordination formation and door mounting mounts both a front door and a rear door with respect to front and rear door openings.

7. A method for mounting a vehicle closure member on a vehicle body as in claim 4 wherein the closure member hinge plate is provided with a pair of oversized fastener openings between which the coordination formation thereof is provided, the vehicle body being provided with a pair of oversized openings aligned with the oversized openings of the vehicle body hinge plate with the coordination formation of the vehicle body hinge plate and the coordination formation of the vehicle hinge plate positioned with respect to each other, and threaded fasteners being inserted through the oversized openings of the vehicle body hinge plate, through the oversized openings in the vehicle body, and into threaded openings in a back plate on the vehicle body to provide the mounting.

8. A method for mounting a vehicle closure member on a vehicle body as in claim 4 wherein a threaded fastener is inserted through aligned holes embodying the coordination formation of the vehicle body hinge plate and the coordination formation of the vehicle body with a snug fit that provides positioning, and threading the threaded fastener onto a threaded nut to provide securement of the door mounting.

9. A method for mounting a vehicle closure member on a vehicle body as is claim 8 wherein another threaded fastener is inserted through aligned oversized holes in the vehicle body hinge plate and in the vehicle body spaced from the first mentioned threaded fastener, and a nut being threaded onto the second mentioned threaded fastener to further secure the door mounting.

10. A method for mounting front and rear vehicle doors on driver and passenger sides of a vehicle body, comprising:

sensing the location of a vehicle body within a vision station and sensing the position of coordination formations of the vehicle body and the positions of spaced opening extremity locations of front and rear door openings of both the driver and passenger sides of the vehicle body;

transferring front and rear doors for both the driver and passenger door openings and associated hinges to a hinge station, mounting a door hinge plate of each hinge on the associated door at the hinge station, and also forming a coordination formation on a vehicle body hinge plate of each hinge at a location controlled by the sensing performed at the vision station; and transferring each front and rear driver and passenger door with the associated hinge mounted thereon to a door mounting station and positioning the coordination formation of the vehicle body hinge plate of each hinge with respect to an associated coordination formation of the vehicle body to provide positioning of each door with respect to the associated vehicle body opening and then mounting the vehicle body hinge plate of each hinge on the vehicle body.

11. A system for mounting front and rear vehicle doors at driver and passenger side door openings of a vehicle body, comprising:

a vision station for sensing the location of a vehicle body within the vision station and for sensing the position of coordination formations of the vehicle body and the positions of spaced opening extremity locations of front and rear door openings at both the driver and passenger sides of the vehicle body;

a hinge station that receives front and rear doors for the driver and passenger side door openings, that receives associated hinges and that mounts a door hinge plate of each hinge on the associated door and also forms a coordination formation on a vehicle body hinge plate of each hinge at a location controlled by the sensing performed at the vision station; and a door mounting station to which the vehicle body and each door with the associated hinge mounted thereon are moved and at which the coordination formation of the vehicle body hinge plate of each hinge is positioned with respect to an associated coordination formation of the vehicle body to provide positioning of the door with respect to the associated vehicle body opening for mounting of the door hinge plate on the vehicle body.

* * * * *